US012576678B2

(12) United States Patent
Croffoot

(10) Patent No.: US 12,576,678 B2
(45) Date of Patent: Mar. 17, 2026

(54) ROTATING TRAILER HITCH ARM

(71) Applicant: Kevin Croffoot, Greenville, FL (US)

(72) Inventor: Kevin Croffoot, Greenville, FL (US)

( * ) Notice: Subject to any disclaimer, the term of this patent is extended or adjusted under 35 U.S.C. 154(b) by 557 days.

(21) Appl. No.: 18/103,562

(22) Filed: Jan. 31, 2023

(65) Prior Publication Data

US 2024/0253407 A1     Aug. 1, 2024

(51) Int. Cl.
    *B60D 1/54*       (2006.01)
    *B60D 1/06*       (2006.01)

(52) U.S. Cl.
    CPC ................. *B60D 1/54* (2013.01); *B60D 1/06* (2013.01); *B60D 2001/546* (2013.01)

(58) Field of Classification Search
    CPC ....... B60D 1/54; B60D 1/06; B60D 2001/546
    USPC ...................................................... 280/491.4
    See application file for complete search history.

(56) References Cited

U.S. PATENT DOCUMENTS

| | | | | |
|---|---|---|---|---|
| 5,765,851 A | * | 6/1998 | Parent .................... | B60D 1/167 |
| | | | | 280/491.4 |
| 2022/0348048 A1 | * | 11/2022 | Bruno ...................... | B60D 1/54 |
| 2023/0406052 A1 | * | 12/2023 | Monica .................. | B60D 1/065 |

FOREIGN PATENT DOCUMENTS

| | | | | |
|---|---|---|---|---|
| EP | 0322328 A1 | * | 6/1989 | ........... B62D 53/067 |
| KR | 102377157 B1 | * | 3/2022 | ............... B60D 1/01 |

OTHER PUBLICATIONS

Merged original application with English translation; Paragraphs added (DE 202016105755). (Year: 2025).*

* cited by examiner

*Primary Examiner* — Alentin Neacsu
*Assistant Examiner* — Nathaniel William Watkins
(74) *Attorney, Agent, or Firm* — Lyman Moulton, Esq.; Moulton Patents, PLLC

(57) ABSTRACT

The haul extension is the only product of its kind that offers users with an avant-garde hitch attachment that can be simply installed by inserting the device into a primary hitch to help individuals access cargo in a quicker and more time and energy efficient manner. This unprecedented product is uniquely designed with a durable lock pin to secure positioning; thusly, offering a toll to benefit diverse users.

14 Claims, 5 Drawing Sheets

ROTATING TRAILER HITCH ARM

BACKGROUND

Opening a tailgate, trunk or cargo door can be incredibly difficult for some people, or even near impossible in many cases, which can quickly cause frustration and lead to a waste of valuable time. There have been no products available as original equipment or as an aftermarket to address this problem.

An apparatus or system simplify the ability to open a tailgate, trunk or cargo door with ease when hauling a lot of cargo is not being met by any known device or system at present. There have been no products available as original equipment or as an aftermarket to address this problem either.

SUMMARY OF THE INVENTION

The main purpose of the rotating trailer hitch arm is to provide users with an additional hitch attachment that facilitates hauling items on a vehicle. Thus providing an easier ability to access and open the tailgate, trunk or cargo door.

The haul extension" is able to tow as normal without detaching it every time. Also known as "Gate-R-Tail," the disclosure has a mounting bracket that can receive a ball hitch as well as other attachments.

A trailer hitch disclosed as a rotating trailer hitch arm includes a first arm comprising a first end and a second end and configured to engage with a male insert of a trailer hitch via the first end and a first swivel, wherein the first end comprises a lock boss adjacent the first swivel. The disclosure also includes a second arm comprising a first end configured to engage with the second end of the first arm via a second swivel and comprising a second end. The disclosure further includes a lock plate attached to the second end of the second arm and configured to engage with the locking boss and to lock the second arm in a folded relation to the first arm and comprise a trailer hitch ball.

Figure 1:
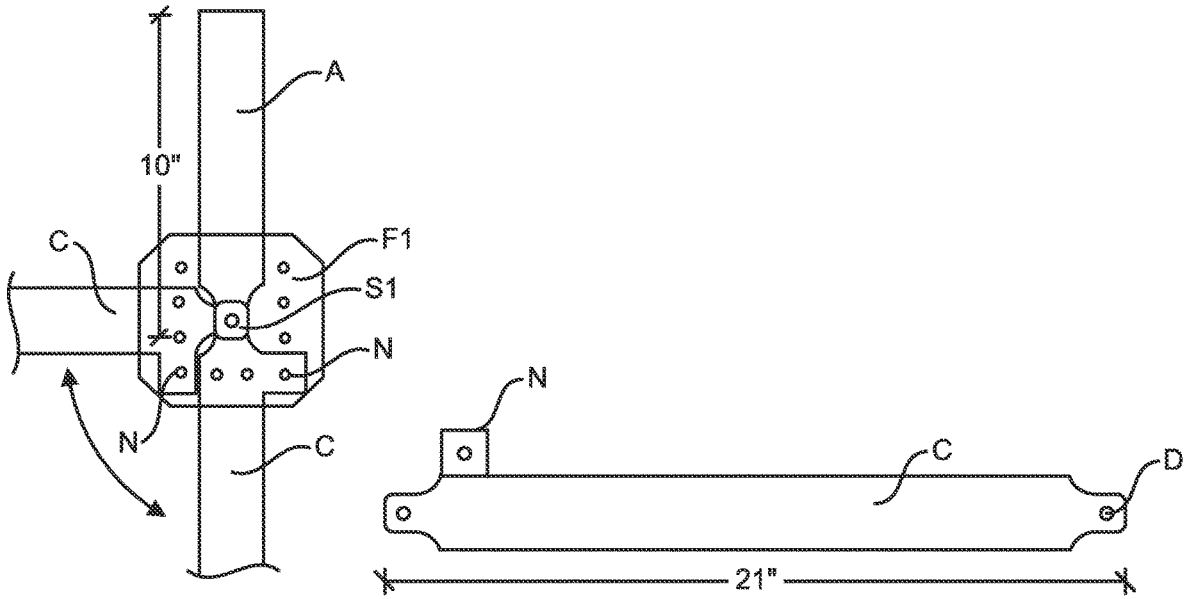
FIG. 1 is a top view of the rotating trailer hitch arm in relation to a male insert in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a top view of the rotating trailer hitch arm in relation to a male insert showing: male insert referenced as A, pin referenced as B, first arm referenced as C, ⅝" hole referenced as D, and lock boss N in multiple positions accordance with an embodiment of the present disclosure. The arc double headed arrows indicate a rotation of the first arm C about the first swivel S1.

Figure 2:
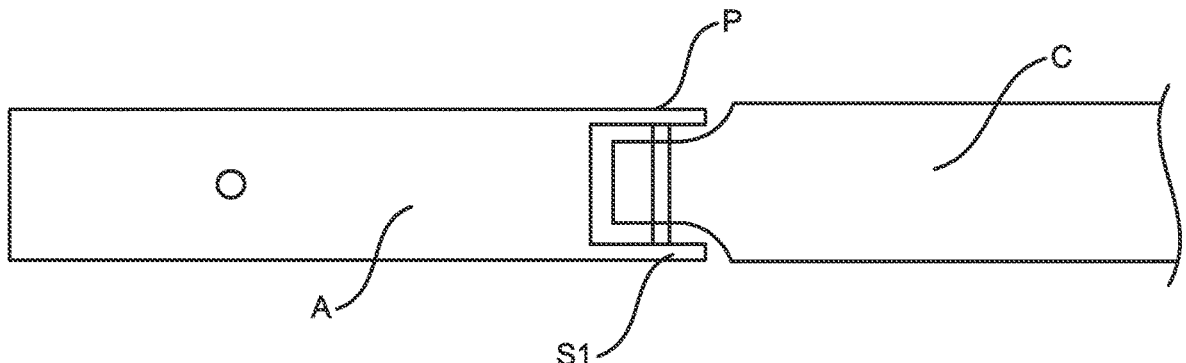
FIG. 2 is a side view of the rotating trailer hitch arm in relation to a male insert in accordance with an embodiment of the present disclosure.

FIG. 2 is a side view of the rotating trailer hitch arm in relation to the male insert showing the swivel pin B, the male insert A and the first arm C. The swivel pin forms a first swivel S1 relation of the first arm with C with the male insert A in a plane of movement parallel with the surface of travel of the respective vehicle and perpendicular to the drawing itself.

Figure 3:
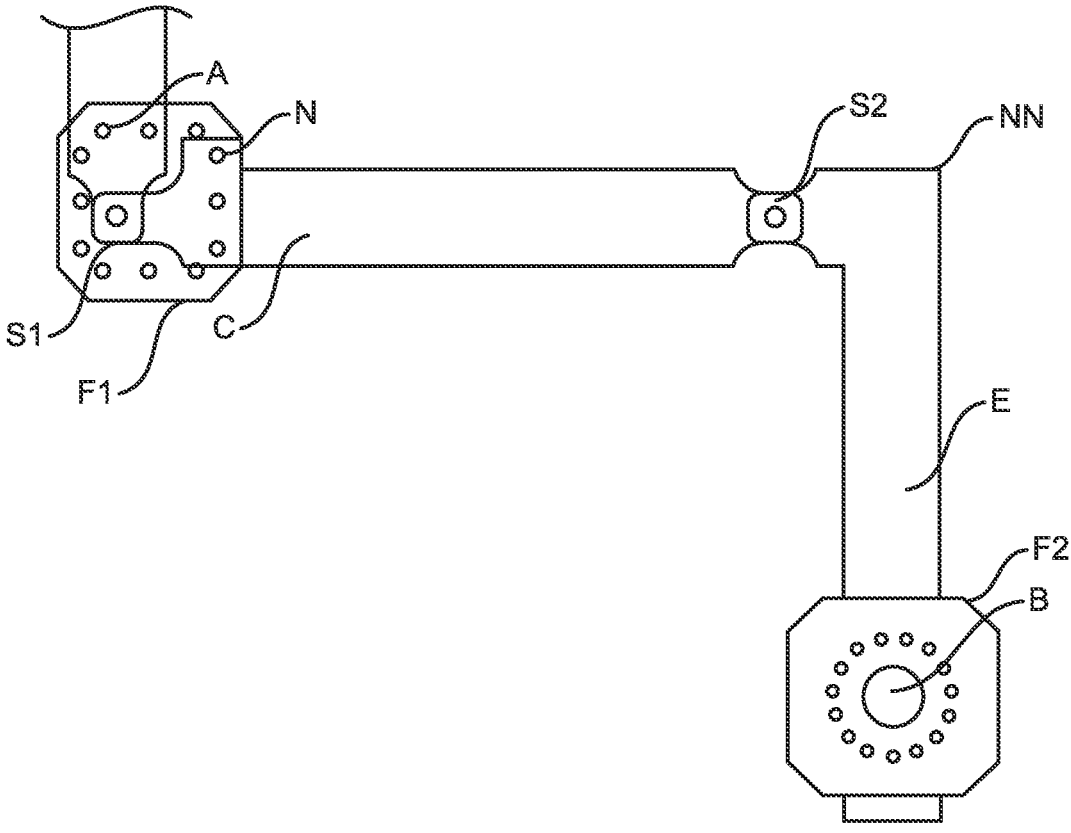
FIG. 3 is a top view of the rotating trailer hitch arm between full extension and folding in accordance with an embodiment of the present disclosure.

FIG. 3 is a top view of the rotating trailer hitch arm in between full extension and folding in accordance with an embodiment of the present disclosure. The depiction includes the first swivel S1 and a second swivel S2, the male insert A, the first arm C with the lock boss N, the second arm E with the ninety degree boss N, the first lock plate F1 and the second lock plate F2 with a towing ball B and the lock boss N and the second arm E.

Figure 4:
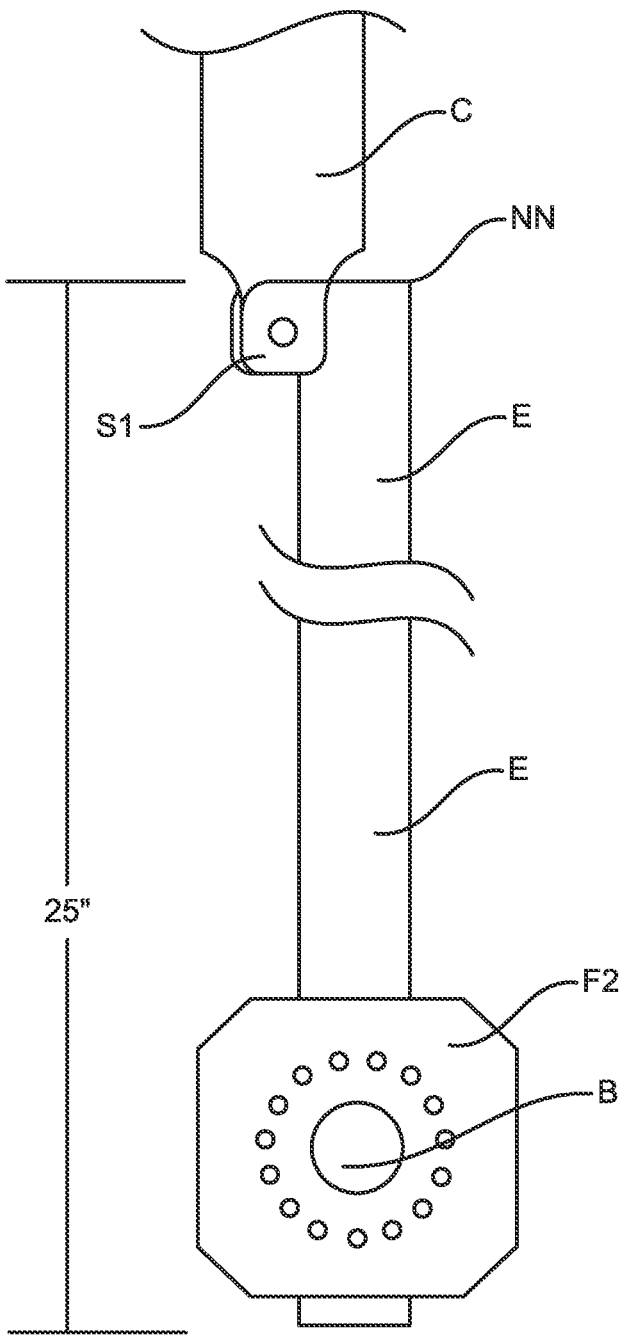
FIG. 4 is a top view of the rotating trailer hitch arm in full extension in accordance with an embodiment of the present disclosure.

FIG. 4 is a top view of the rotating trailer hitch arm in full extension showing: first arm C, the second swivel S2, the second arm referenced as E, the second lock plate F2 with trailer hitch ball B, the ninety degree boss NN, in accordance with an embodiment of the present disclosure.

Figure 5:
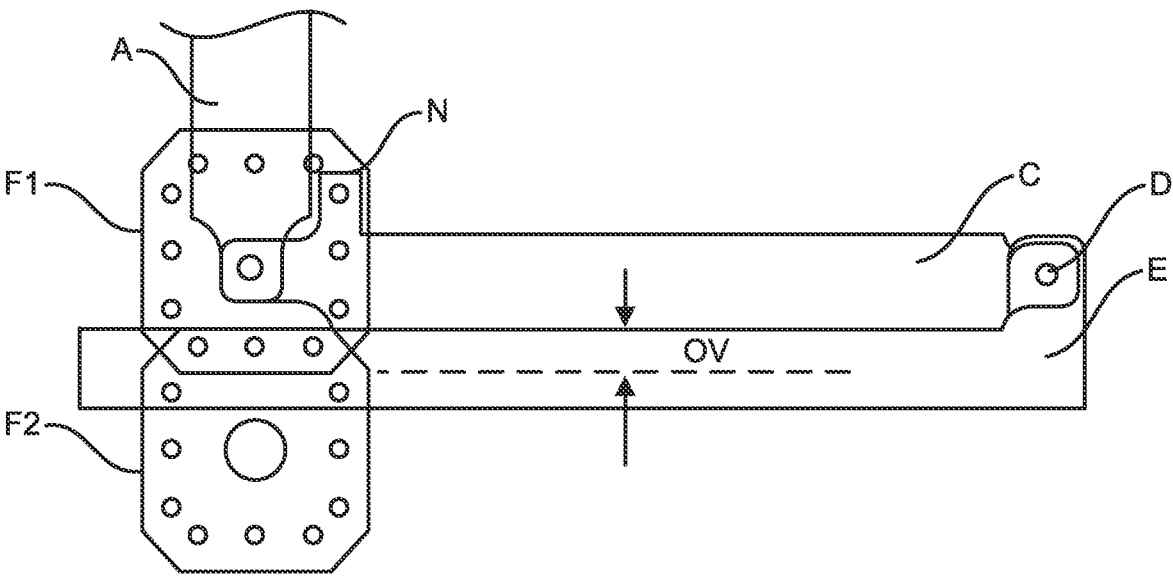
FIG. 5 is a top view of the rotating trailer hitch arm in a folded position in accordance with an embodiment of the present disclosure.

FIG. 5 is a top view of the rotating trailer hitch arm in a folded position showing: male insert A, swivel S1, lock boss N, lock plate F1, lock plate F2 with trailer hitch ball, second arm E, second swivel S2, ninety degree boss NN, and first arm C in accordance with an embodiment of the present disclosure. An overlap OV of the lock plates F1 and F2 enable using a single lock pin to engage both across the lock boss and respective ends of the first and the second arms. An overlap OV as indicated serves to strengthen the folded position for towing while the first arm C and the second arm E are folded up and out of the way.

The present disclosed rotating trailer hitch arm, also known as "Haul Extension" offers a modern accessory that enables users to easily, quickly, and conveniently access the vehicles cargo area and therefore allows for improved efficiency, at all times. Meant to work in complement to a Reese Hitch, the haul extension introduces a novel attachment that simply inserts into the Reese Hitch in order to permit a pulling action via the cotter pin which allows the unit to move on its swiveling hinges. Once the attachment has been secured, users will be able to quickly move the items they are hauling to the side, for easy access to the trunk, tailgate, or cargo door. The haul extension enhances the functionality and usability of any average hitch and makes it more convenient when hauling or attending sports events, outdoor activities like tailgating, etc.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A trailer hitch comprising:

a first arm comprising a first end and a second end and configured to engage with a male insert of a trailer hitch via the first end and a first swivel, wherein the first end comprises a lock boss adjacent the first swivel;

a second arm comprising a first end configured to engage with the second end of the first arm via a second swivel and comprising a second end;

a first lock plate attached to the second end of the second arm and configured to engage with the locking boss and to lock the second arm in a folded relation to the first arm and comprise a trailer hitch ball; and a second lock plate identical to the first lock plate and parallel thereto and directly above the first lock plate.

2. The trailer hitch of claim 1, wherein the second arm further comprises a ninety degree boss configured adjacent the first end and configured to comprise the second swivel.

3. The trailer hitch of claim 2, wherein the ninety degree boss of the second arm limits a travel of the second arm with respect to the first arm.

4. The trailer hitch of claim 1, wherein the first swivel and the second swivel operate via a lock pin.

5. The trailer hitch of claim 1, wherein the first arm is in a 180 degrees relation to the male insert and in a 180 degrees relation to the second arm via the first and second swivel.

6. The trailer hitch of claim 1, wherein the first arm is locked in a ninety degree relation to the male insert via the first lock plate and is locked in a 180 degrees relation to the second arm via the lock plate.

7. The trailer hitch of claim 1, wherein the lock boss and the second arm are locked in a relation to each other via the first lock plate and a lock pin.

8. The trailer hitch of claim 1, a length of the second arm is greater than a length of the first arm.

9. The trailer hitch of claim 8, wherein a length of the first arm is approximately twenty one inches.

10. The trailer hitch of claim 8, wherein a length of the second arm is approximately twenty five inches.

11. The trailer hitch of claim 1, wherein the lock boss limits a travel of the first arm in relation to the male insert.

12. The trailer hitch of claim 1, wherein a length of the first arm is greater than a length of the male insert but less than a length of the second arm.

13. The trailer hitch of claim 1, wherein the first lock plate is parallel to a plane of engagement of the first arm in relation to the second arm.

14. The trailer hitch of claim 13, further comprising the second lock plate parallel to the first lock plate and configured to lock the first arm in relation to the second arm and in relation to the male insert.

* * * * *